United States Patent [19]
Eickelberg

[11] 3,844,453
[45] Oct. 29, 1974

[54] APPARATUS AND METHOD FOR MELTING AND POURING METAL
[75] Inventor: Henry L. Eickelberg, Port Washington, Wis.
[73] Assignee: Modern Equipment Company, Port Washington, Wis.
[22] Filed: Jan. 5, 1973
[21] Appl. No.: 321,450

[52] U.S. Cl.............. 222/399, 164/155, 164/306, 266/38
[51] Int. Cl............................................ B22d 37/00
[58] Field of Search............ 222/394, 399, DIG. 12, 222/DIG. 15; 13/29, 33; 164/155, 156, 251, 266, 306; 266/38, 42

[56] References Cited
UNITED STATES PATENTS

| 2,892,005 | 6/1959 | Lang et al. | 13/33 |
|---|---|---|---|
| 2,936,326 | 5/1960 | Tarua | 164/251 X |
| 3,191,247 | 6/1965 | Holz | 266/38 X |
| 3,321,116 | 5/1967 | Loftin | 266/38 X |
| 3,340,925 | 9/1967 | Woodburn, Jr. | 164/281 |
| 3,384,150 | 5/1968 | Newsome | 164/155 |
| 3,653,426 | 4/1972 | Groteke et al. | 266/38 X |
| 3,675,911 | 7/1972 | Kapan | 266/38 |

FOREIGN PATENTS OR APPLICATIONS
611,549    11/1948    Great Britain.......................... 13/29

Primary Examiner—Robert B. Reeves
Assistant Examiner—David A. Scherbel
Attorney, Agent, or Firm—Meyer, Tilberry & Body

[57] ABSTRACT

An arrangement for melting and pouring metal includes a melting and supply first vessel connected through a lower channel with a holding and pouring second vessel.

The second vessel includes an outlet passage having an outlet opening. The first vessel is heated by a coreless induction heater. The second vessel is pressurized between a ready-to-pour pressure and a pour pressure. At the ready-to-pour pressure, the metal level is slightly below full in the first vessel and slightly below the outlet opening of the outlet passage in the second vessel. At the pour pressure, the metal level in the first vessel is such that the first vessel is substantially full and the metal is flowing from the second vessel over the outlet opening. The connecting channel between the two vessels is dimensioned so that metal freely flows from one vessel to the other as the pressure is changed. This maintains the first vessel substantially full at all times for optimum operating efficiency of the coreless induction heater.

8 Claims, 3 Drawing Figures

PATENTED OCT 29 1974
3,844,453
FIG. 1.
FIG. 2.
FIG. 3.
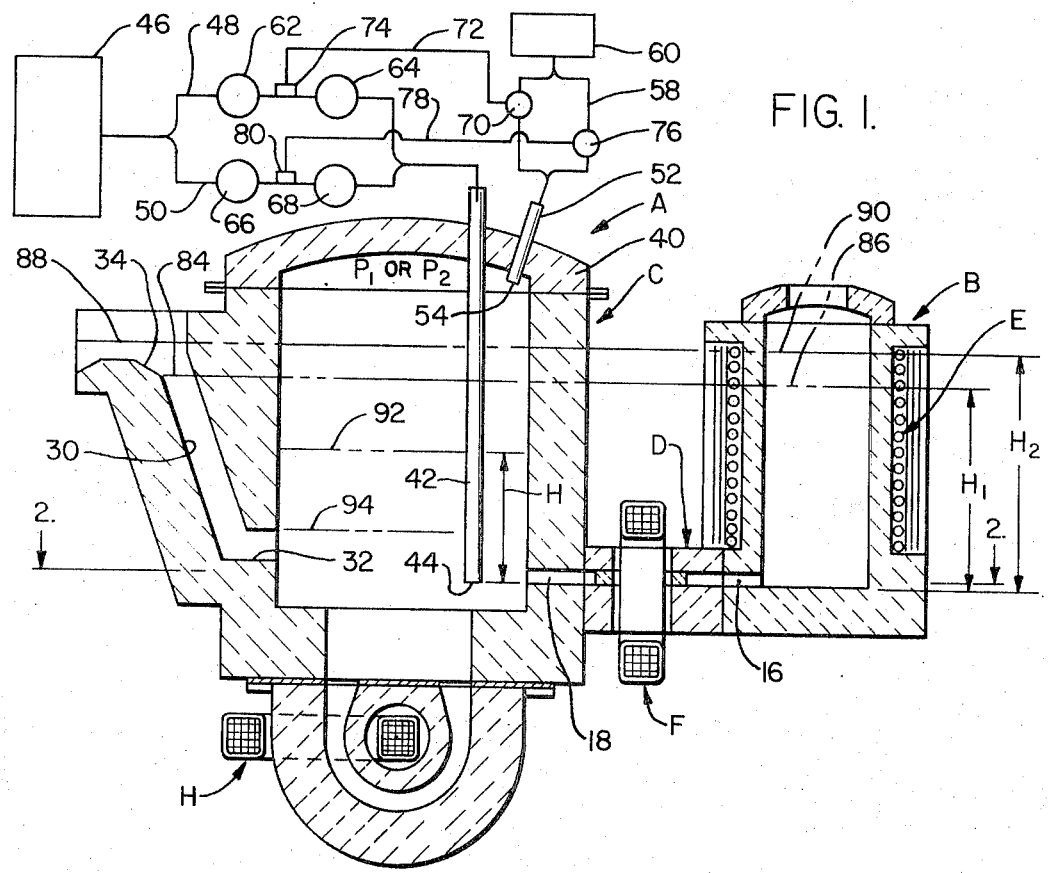
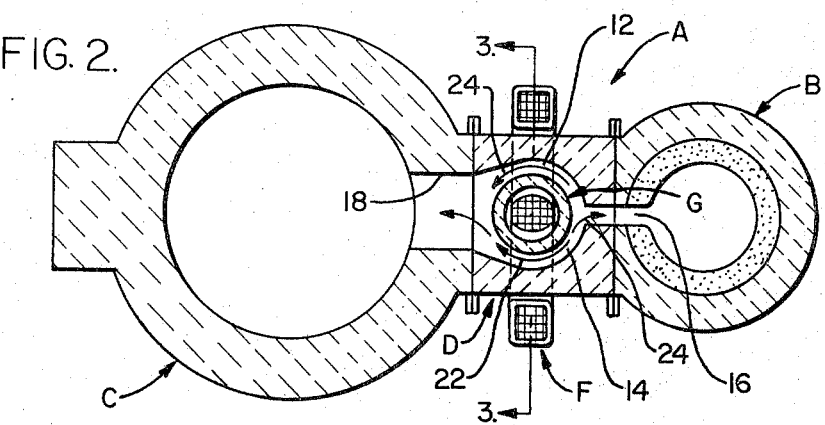
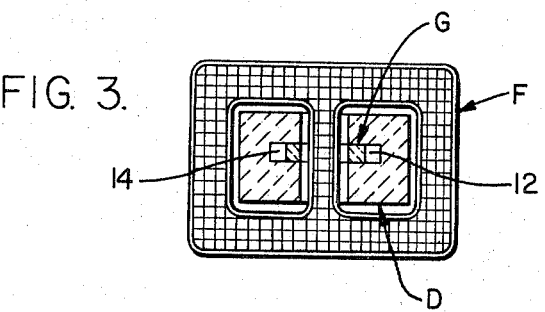

APPARATUS AND METHOD FOR MELTING AND POURING METAL

BACKGROUND OF THE INVENTION

This application relates to the art of melting and pouring metal, and more particularly to pressure pouring of metal.

Pressure pouring apparatus of a known type includes a single vessel containing molten metal. The vessel may be suitably heated for maintaining metal in a molten condition therein. The vessel has a teapot spout outlet passage. Additional metal is charged into the vessel through an inlet opening or tube. The vessel is pressurized between high and low set points. At the high set point, metal flows from the vessel through the teapot spout discharge passage. At the low set point, metal is just below the outlet opening of the teapot spout discharge passage. In apparatus of this type, the metal is melted in a separate melting furnace or the like and must be handled while being conveyed from the melting furnace to the pouring vesel. The necessity of replenishing the pouring vessel with molten metal from a separate melting furnace is a difficult proposition.

Attempts to overcome the charging problem described with respect to single vessel pouring devices have included apparatus having two vessels connected through a connecting channel. One vessel is a melting and supply first vessel, while the other vessel is a holding and pouring second vessel. Having the melting and supply vessel connected at all times with the holding and pouring vessel maintains a constant supply of new molten metal to the pouring vessel. Previous two-vessel apparatus of this type have been constructed in such a manner that accurate pouring of successive shots was difficult, and the melting and supply vessel did not operate with optimum efficiency. For example, U.S. Pat. No. 1,361,754 to Dhe discloses a two-vessel pouring apparatus wherein the two vessels are connected through a bottom connecting channel. In the Dhe patent, it is not clear how the melting and supply vessel is heated. Dhe appears to have attempted supplying heat to the melting vessel with flue gas from a separate melting furnace. Dhe also broadly suggests that it might be possible to pressurize the holding and pouring vessel for discharging metal therefrom. However, Dhe does not have a teapot spout type of discharge passage and it is difficult to imagine how pressure pouring would be accomplished in Dhe. This is particularly true in view of the fact that openings extend into the holding and pouring vessel for flue gas.

Other prior patents disclosing two-vessel apparatus include McAdams 721,381; Daesen 1,736,188; and Shearman 3,184,226. Apparatus of this type includes a gate in the connecting channel between the two vessels. The gate is closed when the holding and pouring vessel is pressurized to discharge metal therefrom. This prevents flow of metal back into the melting and supply vessel when pouring is taking place. The apparatus does not operate between high and low set points. The requirement for a mechanically operated gate in the presence of molten metal makes the apparatus very difficult to manufacture and maintain, and to obtain reliable operation. The requirement of such a gate also slows down the rate at which successive pours can be made due to the time required for closing and opening the gate.

Other two-vessel apparatus include the type disclosed in U.S. Pat. Nos. 2,936,326 to Tama and 2,939,899 to Edstrand. In arrangements of the type disclosed in these patents, the connecting channel between the two vessels is a highly restricted opening. The very restricted opening between the two vessels is for the purpose of minimizing flow of metal from the holding and pouring vessel back into the melting and supply vessel when the holding and pouring vessel is pressurized. Such a restricted opening also reduces the flow rate of metal from the melting and supply vessel over into the holding and pouring vessel when the pressure is lowered. This time delay makes it impossible to rapidly pour successive shots of metal.

Other prior art of interest includes U.S. Pat. No. 3,191,247 to Holz who has an inductor around the connecting channel between two vessels. Holz has an additional chamber in his holding and pouring vessel, and this additional chamber must be evacuated to fill it with metal before it can be pressurized for pouring. Peterson 2,464,714 discloses a two-vessel apparatus of the general type described wherein both vessels are heated by channel-type inductors. Breuer 3,504,899 discloses an apparatus of the general type described and has an inductor around the channel connecting the two vessels.

A channel-type inductor is not self-starting in that solid metal cannot be fed into the vessel and melted by a channel-type inductor. Molten metal must first be melted elsewhere in a melting furnace or the like and supplied to the vessel having a channel-type inductor. Plugging is often a problem with vessels having channel-type inductors because shutting down of the apparatus causes a solid plug of metal to form in the channel.

SUMMARY

A two-vessel apparatus of the type described includes a melting and supply first vessel which is heated by a coreless-type of induction heater. The first vessel is connected through a bottom connecting channel with a holding and pouring second vessel.

A coreless-type of melting furnace can be started with solid metal and does not require an initial charge of molten metal from a separate melting furnace or the like. A coreless-type of melting furnace operates at optimum efficiency only when the furnace vessel is substantially full of metal.

In order to maintain the coreless melting and supply vessel substantially full at all times, the connecting passage between the two vessels is dimensioned for allowing free flow of metal between the two vessels. The holding and pouring vessel is pressurized between high and low set points corresponding to a pour pressure and a ready-to-pour pressure. At the ready-to-pour pressure and the low set point, the metal level in the first vessel is such that the first vessel is only slightly less than substantially full. Also at this low set point, the metal level in the discharge passage from the second vessel is slightly below the outlet opening from the discharge passage. At the high set point or pour pressure, the metal level in the first vessel is such that the first vessel is substantially full. Also at this high set point, metal is flowing out of the second vessel through the discharge opening of the discharge passage. Switching back and forth between the high and low set points provides for successive shots while maintaining the first vessel substantially full at all times so that the coreless induction heater operates at optimum efficiency. Providing a very large connecting channel between the two vessels makes it possible to pour successive shots rapidly.

In the preferred arrangement, the connecting channel between the two vessels is dimensioned at least as large as the teapot spout discharge passage so that metal can flow just as readily from the second vessel back into the first vessel as it flows from the second vessel out the discharge passage.

In accordance with another aspect of the device, a channel-type inductor is provided in the connecting channel between the two vessels. The connecting channel has a first channel passage between the first vessel and the channel inductor, and a second channel passage between the channel inductor and the second vessel which is substantially larger than the first channel passage. During operation of the channel inductor in the connecting channel, the pinch effect causes surges of metal into the holding and pouring vessel while minimizing such surges into the melting and supply vessel because of the difference in size between the first and second channel passages. Due to the pinch effect, a strong suction is produced where the channel inductor discharges into the holding and pouring vessel through the second channel passage. This effects a direct return movement of molten metal into the same passage. As is well known, the flow of metal in a channel-type inductor presents a pulsing condition in each leg, and the law of action and reaction applies. Therefore, due to the relatively low resistance in the flow path from the channel inductor to the second vessel, as compared with the high resistance against flow through the smaller first channel passage to the first vessel, the majority of metal flow will be into the second vessel. This condition of maximum surging into the holding and pouring vessel provides a heat source which is capable of maintaining the necessary temperature of metal in the holding and pouring vessel under normal circumstances.

Where additional heat is required for maintaining the metal in a molten condition in the second vessel, as may be required for very large capacity vessels, another channel-type inductor or other heating means can be added to the second vessel.

An apparatus constructed in accordance with the present invention eliminates the need to transfer molten metal from a large primary melter to a pouring vessel.

In accordance with one arrangement, the volume capacity of the pouring and holding vessel is substantially greater than the volume capacity of the melting and supply vessel. This reduces the overall size of the entire apparatus while maintaining a sufficient supply of molten metal to the pouring vessel due to the high operating efficiency of the coreless melting furnace.

Melting metals in a coreless induction furnace usually requires batch operation. A great deal of time is consumed in charging, slagging and pouring molten metal from the coreless induction furnace. There is also a problem with conveying molten metal from one station or vessel to another.

In accordance with the present invention, an improved melting machine is provided whereby the coreless induction furnace is directly connected with a pouring vessel.

It is a principal object of the present invention to provide an improved apparatus and method for melting and pouring metal.

It is also an object of the present invention to provide such an apparatus which operates in a more efficient manner.

It is an additional object of the present invention to provide such an apparatus and method which are easily carried out.

It is a further object of the present invention to provide such an apparatus and method in such a manner that the apparatus may be left for a time without solidification of metal therein.

It is another object of the present invention to provide a two-vessel apparatus of the type described with a channel-type inductor in the connecting channel between the two vessels.

BRIEF DESCRIPTION OF THE DRAWING

The invention may take form in certain parts and arrangements of parts, a preferred embodiment of which will be described in detail in this specification and illustrated in the accompanying drawing which forms a part hereof.

FIG. 1 is a side cross-sectional elevational view of an apparatus constructed in accordance with the present invention;

FIG. 2 is a cross-sectional plan view looking generally in the direction of arrows 2—2 of FIG. 1; and FIG. 3 is a cross-sectional elevational view looking generally in the direction of arrows 3—3 of FIG. 2.

DESCRIPTION OF A PREFERRED EMBODIMENT

Referring now to the drawings, wherein the showings are for purposes of illustrating a preferred embodiment of the invention only and not for purposes of limiting same, FIG. 1 shows an improved apparatus A for melting and pouring metal constructed in accordance with the present invention. Apparatus A includes a melting and supply first vessel B, and a holding and pouring second vessel C. Each vessel B and C includes a bottom portion, and the bottom portions are connected by a connecting channel D. Vessels B and C, and connecting channel D, are constructed of or lined with refractory material in a known manner.

In accordance with a preferred arrangement, first vessel B has a volume capacity substantially less than the volume capacity of second vessel C. In one arrangement, the volume capacity of first vessel B may be around one-half the volume capacity of second vessel C. This reduces the overall size of the entire apparatus while maintaining sufficient melting capacity for continuously supplying molten metal to second vessel C.

In accordance with the invention, first vessel B has a coreless-type induction heating coil E positioned therearound. Thus, first vessel B defines a coreless induction melting furnace. Induction coil E is of a known type and may take many forms. One specific construction of a coreless induction furnace for melting metal can be found in U.S. Pat. No. 3,004,091 to Tama. The field produced by coreless induction coil E creates eddy currents in metal located within vessel B for heating and melting the metal.

In accordance with a preferred arrangement, a channel-type inductor F is positioned in connecting channel D intermediate vessels B and C. Channel-type inductor F may surround connecting channel D and extend through a hollow divider G. Divider G provides opposite passages 12 and 14 connected with a first passage 16 leading from first vessel B to the channel-type inductor. Passages 12 and 14 are also connected with a second channel passage 18 extending from channel inductor F to second vessel C. Passages 12 and 14 together have a greater cross-sectional area than first passage 16, and second passage 18 has a substantially greater cross-sectional area than first passage 16. During operation of channel inductor F, metal surges in the direction of arrows 22 and 24. Due to the more limiting area of first channel passage 16, the pinch effect causes surges of metal in the direction of arrows 22 through larger second channel passage 18 into second vessel C. This constant surging of metal from the connecting channel into second vessel C provides a constant stirring of molten metal within second vessel C and heating thereof for maintaining the molten metal at a desirable temperature. In the preferred arrangement, second channel passage 18 is substantially greater than first channel passage 16, and may be at least around three times larger.

In accordance with one arrangement, second vessel C has a teapot spout discharge passage 30 having an entrance opening 32 near the bottom of vessel C and an outlet opening 34 located at substantially the full metal level position for vessels B and C.

In accordance with one arrangement, pressure means is provided for pressurizing second vessel C which is suitably sealed by cover member 40. The pressurizing means may take many forms, including the types described in U.S. Pat. No. 3,058,180 to Port. Many other known arrangements may be used for pressurizing vessel C between high and low set points, and one will be generally described for purposes of illustration. A gas tube 42 extends through cover member 40 into vessel C and has its bottom outlet end 44 located in substantially the same horizontal plane as the bottom of vessel B. Gas inlet tube 42 is connected with a source of pressurized gas illustrated by numeral 46 through lines 48 and 50. An exhaust line 52 extends through cover member 40 and has its end 54 located in the upper portion of vessel C above the maximum metal level therein. Exhaust tube 52 communicates through lines 56 and 58 with a recapture reservoir 60.

Conduit 48 includes a pressure regulating valve 62 and an on-off valve 64. Conduit 50 includes a pressure regulating valve 66 and an on-off valve 68. Conduit 56 includes a relief valve 70 connected through a line 72 for operation by a pressure switch 74. Conduit 58 includes a relief valve 76 connected through a line 78 for operation by a pressure switch 80 in conduit 50.

The pressurizing means is adapted to maintain a pressure within second vessel C so that the metal level in outlet passage 30 is at a low set point 84 just below outlet opening 34. This same level will be maintained as at 86 in first vessel B. Level 86 represents a ready-to-pour pressure level wherein the level of metal in first vessel B is only slightly below the full condition of vessel B. Second vessel C is also adapted to be pressurized to a high set point or pour pressure represented by line 88. This also raises the metal level in first vessel B as indicated at 90 to a substantially full condition for vessel B. The actual level of metal in second vessel C is represented by line 92 which may vary between full line 84 and lowermost level 94 which is slightly above the outlet to outlet passage 30. The desirable pressures for the low and high set points are represented by metal levels H1 and H2 to the right of first vessel B. The first pressure regulating valve 62 is set to a pressure corresponding to a head of metal H1. When valve 64 is opened, gas will flow through pressure regulating valve 62 into gas inlet tube 42 and out its lower end 44. The pressure works against a head of metal H in second vessel C which is variable depending upon the actual amount of metal in second vessel C. Sufficient gas pressure will build up above the actual metal level in second vessel C until a variable pressure P1 is reached. Pressure P1 plus head H will be equal to a height of metal H1. Gas pressure P1 will be lesser or greater depending upon whether metal level H in second vessel C is low or high. If additional metal is charged into melting and supply first vessel B, the level of metal therein will tend to rise above level 86. In addition, this will tend to cause an increase in actual metal head H in second vessel C. This will also increase pressure P1 so that P1 plus H will be somewhat greater than the pressure represented by head of metal H1. Pressure sensing switch 74 will sense this increase in pressure in tube 42 to open relief of valve 70 in conduit 56 for bleeding some gas from above the metal in second vessel C to reduce pressure P1 until P1 plus the greater H again substantially equal H1.

When it is desired to pour metal, valve 64 is closed simultaneously with opening of valve 68. Pressure regulating valve 66 is adjusted to admit pressure through inlet tube 42 equal to head H2. The gas pressure flowing through pressure regulating valve 66 works against the actual head of metal H in second vessel C and admits gas pressure P2 above the metal level. P2 plus H will then be substantially equal to head H2 and no more gas will be admitted through pressure regulating valve 66. The metal level will then rise to level 88 wherein metal will flow from second vessel C through outlet passage 30 and over outlet opening 34. As metal is poured, actual metal level H in second vessel C decreases so that H plus P2 would tend to be less than head H2. However, pressure regulating valve 66 continues to admit gas into second vessel C for increasing pressure P2 so that P2 plus H remains substantially the same as H2. If additional metal is charged into melting and supply vessel B during pouring, the metal level in first vessel B will tend to rise above high set point 90 and increase head H2. This will also tend to increase head H in second vessel C. Pressure sensing switch 80 in conduit 50 will sense this increase in pressure in inlet tube 42 for opening relief valve 76 to bleed some gas pressure from above the metal level in second vessel C.

Once valve 68 has been opened for a predetermined amount of time to pour a predetermined volume of metal from second vessel C, valve 68 is closed simultaneously with opening of valve 64. Pressure sensing switch 74 will immediately sense a higher pressure in tube 42 and open relief valve 70 until P1 plus H equal H1. The device is sequentially operated between the ready-to-pour pressure low set point and the pour pressure high set point. Melting and supply first vessel B is maintained substantially full at all times for optimum operating efficiency of the coreless induction heater. Connecting channel D is dimensioned so that metal may freely flow from one vessel to the other. Thus, when the pressure in second vessel C is increased to the high set point, metal flows as readily back into first vessel B through connecting channel D as it flows through outlet passage 30 and outlet opening 34. The arrangement described makes it possible to continuously supply metal to melting and supply first vessel B during operation of the apparatus. If desired, feeding of additional metal to first vessel B may take place intermittently.

It is obvious that floats or other level sensing devices may be used for controlling operation of the pressurizing means and for obtaining read-outs regarding the actual metal level in second vessel C.

It will be recognized that it is possible to maintain a pressure within second vessel C corresponding to high set point 88. A vertical discharge orifice would then be connected to outlet opening 34 and closed by a stopper rod. Metal level 88 would maintain a predetermined head over the vertical outlet orifice and intermittent opening and closing of the stopper would discharge predetermined amounts of metal from second vessel C.

A minimum of slag will be carried over from a first vessel B to second vessel C and substantially eliminates the problem of slag removal in second vessel C.

If desired, and particularly for large capacity second vessel C, an additional channel inductor I may be located in the bottom of second vessel C for supplying additional heat to maintain metal therein molten even during stand-by operations. In the preferred operation, connecting channel D is dimensioned relative to outlet passage 30 so that identical levels 88 and 90 are reached substantially simultaneously in raising from identical levels 84 and 86. Likewise, reverse flow may also take place at substantially the same rate so that lower set point levels 84 and 86 will be reached substantially simultaneously when changing from high set point level 88 and 90.

Although the invention has been described with respect to a preferred embodiment, it is obvious that equivalent alterations and modifications will occur to others skilled in the art upon the reading and understanding of this specification. The present invention includes all such equivalent alterations and modifications and is limited only by the scope of the claims.

Having thus described my invention, I claim:

1. In apparatus for melting and pouring metal comprising; a melting and supply first vessel, a holding and pouring second vessel, a connecting channel connecting said vessels adjacent the bottom portions thereof, an outlet pour passage in said second vessel having an outlet opening, and pressurizing means for pressurizing said second vessel between a ready-to-pour pressure wherein molten metal in said second vessel is slightly below said outlet opening and a pour pressure wherein molten metal flows from said second vessel through said outlet opening, the improvement which comprises said first vessel being at atmospheric pressure and said connecting channel being dimensioned for allowing free flow of molten metal between said first and second vessels as said pressurizing means is switched between said ready-to-pour and pour pressures so that said first vessel remains substantially full at all times and the metal level therein fluctuates only between low and high levels corresponding to said ready-to-pour pressures while the metal level in said second vessel fluctuates between a high level corresponding to said pour pressure and variable lower levels and coreless induction heating means for heating and melting metal in said first vessel extending upwardly to a point at least adjacent the low level and a channel-type induction heater in said connecting channel, said connecting channel having a first channel passage between said first vessel and said channel-type induction heater and a second channel passage between said channel-type induction heater and said second vessel, said second channel passage being larger than said first channel passage.

2. The apparatus of claim 1 and further including second vessel heating means for heating metal in said second vessel.

3. The apparatus of claim 2 wherein said second vessel heating means comprises a channel-type induction heater.

4. A method for melting and pouring metal comprising the steps of; providing a coreless induction melting and supply first vessel connected through a lower connecting channel with a holding and pouring second vessel having an outlet passage including an outlet opening, venting said first vessel to atmospheric pressure, pressurizing said second vessel to a ready-to-pour first pressure wherein the metal level in said first vessel is slightly below the full level and the metal level in said outlet passage is slightly below said outlet opening, pressurizing said second vessel to a pour second pressure greater than said first pressure wherein the metal level in said first vessel is substantially at the full level and the metal level in said outlet passage is higher than said outlet opening, and fluctuating between said first and second pressures for making successive pours from said second vessel while maintaining said first vessel substantially full at all times by allowing free flow of molten metal between said vessels through said connecting channel and heating the metal in said first vessel by electric currents induced into the metal at least adjacent the surface when the metal is slightly below the full level.

5. The method of claim 4 and further including the step of heating metal in said connecting channel with a channel-type induction heater.

6. The method of claim 5 and further including the step of providing surges of metal from said connecting channel into said second vessel during operation of said channel-type induction heater by constructing said connecting channel with a larger channel passage between said channel-type induction heater and said second vessel than between said channel-type induction heater and said first vessel.

7. The method of claim 6 and further including the step of heating metal in said second vessel.

8. The method of claim 4 and further including the step of heating metal in said second vessel.

* * * * *